United States Patent
Hamad et al.

(10) Patent No.: US 11,339,754 B1
(45) Date of Patent: May 24, 2022

(54) VEHICLE SYSTEM WITH FUEL SEPARATION SYSTEM AND METHOD OF USING SAME

(71) Applicant: SAUDI ARABIAN OIL COMPANY, Dhahran (SA)

(72) Inventors: Esam Z. Hamad, Brighton, MI (US); David J. Cleary, West Bloomfield, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/314,773

(22) Filed: May 7, 2021

(51) Int. Cl.
| | |
|---|---|
| *F02M 31/02* | (2019.01) |
| *F02M 37/22* | (2019.01) |
| *F02M 25/08* | (2006.01) |
| *B01D 3/06* | (2006.01) |
| *F02D 19/06* | (2006.01) |
| *F02D 41/00* | (2006.01) |

(52) U.S. Cl.
CPC ............ *F02M 37/22* (2013.01); *B01D 3/06* (2013.01); *F02D 19/0665* (2013.01); *F02D 41/003* (2013.01); *F02M 25/0836* (2013.01); *F02M 31/02* (2013.01)

(58) Field of Classification Search
CPC .... F02M 37/22; F02M 25/0836; F02M 31/02; F02M 41/003; F02D 19/0665; B01D 3/06
USPC ....... 123/1 A, 3, 27 GE, 525, 431, 299, 300, 123/536, 538, 543, 557
See application file for complete search history.

(56) References Cited

U.S. PATENT DOCUMENTS

| | | |
|---|---|---|
| 3,985,108 A | 10/1976 | Matsumoto et al. |
| 5,357,908 A | 10/1994 | Sung et al. |
| 5,794,601 A | 8/1998 | Pantone |

(Continued)

FOREIGN PATENT DOCUMENTS

| | | |
|---|---|---|
| EP | 1057988 B1 | 1/2006 |
| JP | 4214893 B2 | 1/2009 |

(Continued)

OTHER PUBLICATIONS

Partridge, Randall D. et al., "Onboard Gasoline Separation for Improved Vehicle Efficiency"; SAE International Journal of Fuels and Lubricants; vol. 7, Issue 2; pp. 366-378; Apr. 1, 2014 (13 pages).

(Continued)

*Primary Examiner* — Hai H Huynh
(74) *Attorney, Agent, or Firm* — Osha Bergman Watanabe & Burton LLP

(57) ABSTRACT

A vehicle system includes a fuel separation system, a combustion engine, and a computer control system. The fuel separation system includes one or more fuel separation units, the vehicle system is configured to recover from the fuel separation system and maintain vapor fuel fractions as vapor throughout the vehicle system, and the combustion engine is configured to receive a vapor fuel feed and a liquid fuel feed. A method for operating the vehicle system includes separating a vehicle fuel with a fuel separation system into a plurality of fuel fractions, recovering and maintaining the vapor fuel fractions as vapor throughout the vehicle system, producing a vapor fuel feed and a liquid fuel feed, and introducing at least one of the vapor fuel feed and the liquid fuel feed to a combustion engine.

17 Claims, 4 Drawing Sheets

(56) References Cited

U.S. PATENT DOCUMENTS

| | | |
|---|---|---|
| 5,868,119 A * | 2/1999 | Endo .................. F02M 33/02 |
| | | 123/516 |
| 6,119,637 A | 9/2000 | Matthews et al. |
| 6,494,192 B1 | 12/2002 | Capshaw et al. |
| 6,622,663 B2 | 9/2003 | Weissman et al. |
| 6,972,093 B2 | 12/2005 | Partridge et al. |
| 7,013,844 B2 | 3/2006 | Oda |
| 7,107,942 B2 | 9/2006 | Weissman et al. |
| 7,370,610 B2 | 5/2008 | Ashford et al. |
| 8,257,583 B2 | 9/2012 | Partridge et al. |
| 9,464,596 B2 | 10/2016 | Leone et al. |
| 9,776,624 B1 | 10/2017 | Leone et al. |
| 9,816,467 B2 | 11/2017 | Hamad et al. |
| 9,827,850 B2 | 11/2017 | Hamad et al. |
| 9,957,903 B2 | 5/2018 | Hamad et al. |
| 10,436,126 B2 | 10/2019 | Hamad et al. |
| 10,598,100 B2 | 3/2020 | Hamad et al. |
| 10,697,412 B2 | 6/2020 | Hamad et al. |
| 10,760,507 B2 | 9/2020 | Hamad et al. |
| 11,094,948 B2 * | 8/2021 | Wach .................. B60L 58/34 |
| 2006/0037589 A1 | 2/2006 | Gupta et al. |
| 2013/0289850 A1 | 10/2013 | Johnson et al. |
| 2018/0245547 A1 | 8/2018 | Hamad et al. |

FOREIGN PATENT DOCUMENTS

| | | |
|---|---|---|
| JP | 4411700 B2 | 2/2010 |
| JP | 2012-225195 A | 11/2012 |
| JP | 5071276 B2 | 11/2012 |
| WO | 2018/029606 A1 | 2/2018 |

OTHER PUBLICATIONS

Khan, Ahmad et al., "Investigation of onboard fuel separation for passenger vehicles"; Energy; vol. 169; pp. 1079-1089; Feb. 15, 2019 (11 pages).

* cited by examiner

VEHICLE SYSTEM WITH FUEL SEPARATION SYSTEM AND METHOD OF USING SAME

BACKGROUND

Vehicles, such as cars, trucks, boats, all-terrain vehicles, and otherwise, typical use internal combustion engines for power. These combustion engines require fuel, such as gasoline, diesel, or otherwise, to operate. The fuel is often characterized by a research octane number (RON) or cetane number.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a vehicle system. The vehicle system includes a fuel separation system, a combustion engine, and a computer control system. The fuel separation system includes one or more fuel separation units configured to receive and separate a vehicle fuel into a plurality of fuel fractions including a first fuel fraction, a second fuel fraction and an optional third fuel fraction. The vehicle system is configured to recover from the fuel separation system and maintain the first fuel fraction and the optional third fuel fraction as vapor throughout the vehicle system. The combustion engine is configured to receive a vapor fuel feed and a liquid fuel feed, the vapor fuel feed containing at least one of the first fuel fraction and the optional third fuel fraction and the liquid fuel feed comprising at least one of the second fuel fraction and the vehicle fuel.

In another aspect, embodiments disclosed herein relate to a method for operating the vehicle system. The method includes separating a vehicle fuel with a fuel separation system into a plurality of fuel fractions including a first fuel fraction, a second fuel fraction and an optional third fuel fraction, recovering and maintaining the first fuel fraction and the optional third fuel fraction from the fuel separation system as vapor, producing a vapor fuel feed containing at least one of the first fuel fraction and the optional third fuel fraction, and a liquid fuel feed containing at least one of the second fuel fraction and the vehicle fuel; and introducing at least one of the vapor fuel feed and the liquid fuel feed to a combustion engine.

Other aspects and advantages of the claimed subject matter will be apparent from the following description and the appended claims.

DETAILED DESCRIPTION

Embodiments herein relate to a fuel separation system that may be mounted on-board a vehicle, such as a car, truck, boat, or other vehicle that utilizes a combustion engine to generate motive power. In some aspects, the fuel separation system includes a fuel separation unit, such as a flash distillation unit, that is controllable to separate an input fuel stream into two or more fractional fuel streams based on a volatility difference of components of the fuel mixture.

Embodiments herein may use flash distillation, for example, to separate a fuel feed stream into vapor and liquid phases. The separations may separate the fuel into various fractions, some of which may be more aromatic in content and which have high RON, and some of which are high in paraffinic compounds, that mostly have low RON. Embodiments of the vehicle systems herein may then feed the vapor fraction directly to the engine without the need to condense it.

Figure 1A:
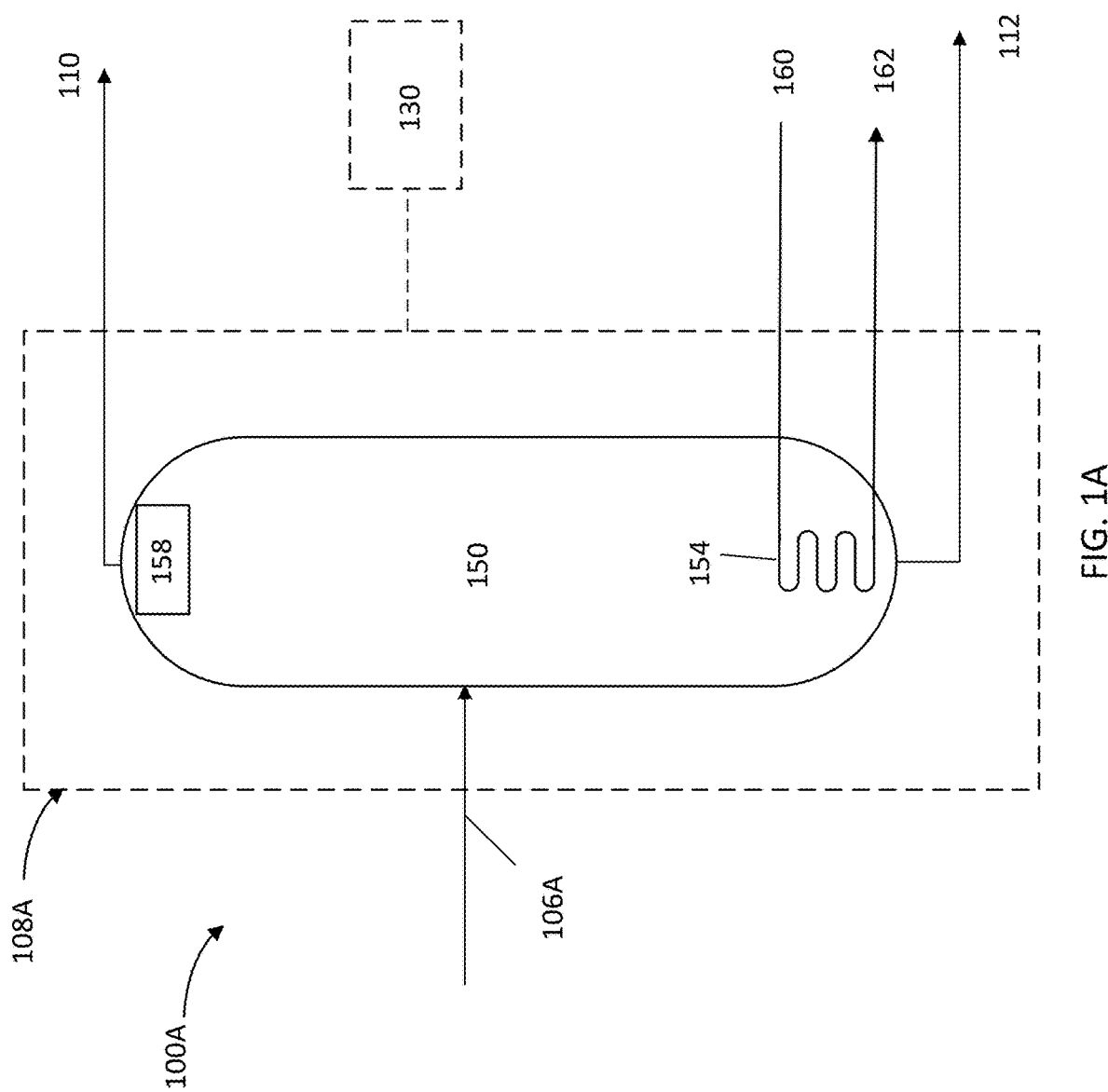
FIG. 1A is a schematic diagram of an exemplary on-board fuel separation system.

FIG. 1A is a schematic for an on-board fuel separation system 100A ("subsystem"). A vehicle fuel is introduced into the subsystem 100A using a fuel feed conduit 106A. The vehicle fuel passes downstream through the fuel feed conduit 106A into a fuel separation unit 150 of a separation system 108A. The fuel separation unit 150 fractionates the vehicle fuel into a plurality of fuel fractions including a first fuel fraction (high volatility vapor fraction) and a second fuel fraction (low volatility liquid fraction). Heat is provided to the fuel separation unit 150 by way of a heating coil 154 proximate to the bottom of the fuel separation unit 150. The heating coil 154 couples to heating coil feed conduit 160 and heating coil return conduit 162 such that a hot fluid may pass through the heating coil 154 and drive the separation. The first fuel fraction passes through a demister 158 in the upper portion of the fuel separation unit 150 before egressing from the separation system 108A using a first fuel fraction conduit (vapor) 110. The second fuel fraction passes from the bottom of the fuel separation unit 150 and out from the separation system 108A using a second fuel fraction conduit (liquid) 112. A computer control system 130 couples to portions of the separation system 108A to detect aspects of the operation and to send command signals to energized portions of the separation system 108A.

The fuel separation unit 150 may be any separation unit that is capable of achieving the desired fuel separation characteristics, flow rates and fuel fractions. For example, the fuel separation unit 150 may be a flash drum (flash distillation tank), a distillation column, membrane distillation, compact distillation column, or other separators known in the art to separate a mixture into two or more fractions based on volatility.

In some embodiments, the fuel separation unit 150 may be a trayed distillation column. The number of trays, types of trays, and the dimensions of the distillation column may be based on the required quantities and properties of the fuel fractions.

In other embodiments, the fuel separation unit 150 may be a packed distillation column. Packing may be random or structured, and the types of packing may be any conventionally available packing. The examples of packing may be, but are not limited to, Heli-pak, Pro-Pak®, saddles, rings, balls, wires mesh, knitted packing, and the materials may be polymeric, metallic, ceramic or any other materials that are suitable for achieving the required fuel separation.

In some embodiments, the fuel separation unit 150 may be a flash drum which may also be referred to as a flash distillation column. In the embodiment flash distillation column, a fuel feed conduit 106A may have one or more optional valves (not shown in FIG. 1A), such as a valve on the feed line that may reduce the pressure of, and partially vaporize the fuel feed. The optional valve may be a throttling valve or any other valve conventionally used in a flash column. One or more optional valves may also be provided to increase the pressure in the tank to above ambient pressure to provide better separation or alter the relative flow rates of the vapor and liquid streams. In addition, higher pressure may allow easier injection of the vapor into the engine. The flash drum tank may have an insulating material in the exterior to minimize heat losses at the controlled flash temperature.

In some embodiments, the fuel separation unit 150 may be a membrane distillation unit. Embodiment membrane distillation unit may include direct contact membrane distillation (MD), air gap MD, vacuum MD, sweeping gas MD, vacuum multi-effect MD, and permeate gap MD, among many other MD units that are suitable for achieving the required fuel separation.

In some embodiments, the heating coil 154 may be internal and placed inside, near the bottom of the fuel separation unit 150 and directly heat the fuel. In other embodiments, the heating coil 154 may be external and provide the heat by conduction through the wall of the fuel separation unit 150.

The embodiment demister 158 may be a mesh-type coalescer, vane pack or any other structures conventionally used in separation processes to remove mist from a vapor stream and prevent or reduce liquid droplets (mist) from being carried with the vapor stream.

In some embodiments, the subsystem may contain multiple fuel separation units. For illustrative purpose, embodiments with two fuel separation units are described as an example. However, the embodiments are not limited to the example and the number of fuel separation units in the fuel separation system may be adjusted as required by the application.

Figure 1B:
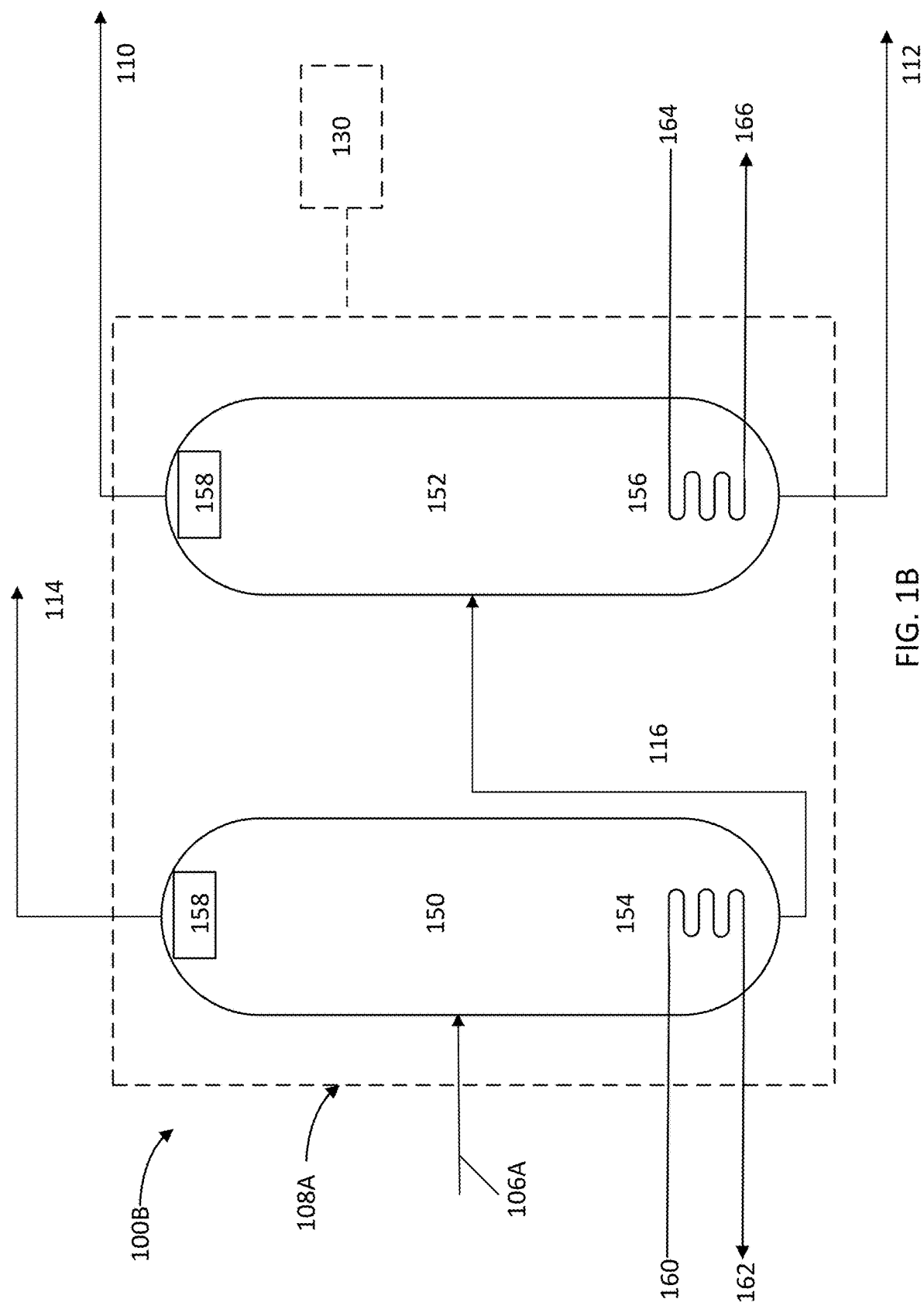
FIG. 1B is a schematic diagram of another exemplary on-board fuel separation system.

FIG. 1B is a schematic for an on-board fuel separation system "subsystem" 100B. A vehicle fuel is introduced into the subsystem 100B using a fuel feed conduit 106A and the unseparated fuel passes downstream through the fuel feed conduit 106A into a fuel separation unit 150 of a separation system 108B. Heat is provided to the fuel separation unit 150 by way of a heating coil 154 proximate to the bottom of the fuel separation unit 150. The heating coil 154 couples to a heating coil feed conduit 160 and a heating coil return conduit 162 such that a hot fluid may pass through the heating coil 154 and drive the separation. The vehicle fuel is separated into a third fuel fraction (high volatility vapor fraction) and an intermediate fuel fraction (low volatility liquid fraction). The third fuel fraction passes through a demister 158 and egresses from the separation system 108B using a third fuel fraction conduit (vapor) 114. The intermediate fuel fraction passes from the bottom of the fuel separation unit 150 and is introduced into a second fuel separator unit 152 using an intermediate fuel fraction conduit (liquid) 116. The second fuel separator unit 152 fractionates the intermediate fuel fraction into a first fuel fraction (intermediate volatility vapor fraction) and a second fuel fraction (low volatility liquid fraction). Heat is provided to the second fuel separation unit 152 by way of a second heating coil 156 proximate to the bottom of the second fuel separation unit 152. The second heating coil 156 is coupled to second heating coil feed conduit 164 and second heating coil return conduit 166 such that a hot fluid may pass through the second heating coil 156 and drive the separation. The first fuel fraction passes through a demister 158 in the upper portion of the second fuel separation unit 152 before egressing from the separation system 108B using a first fuel fraction conduit 110. The second fuel fraction passes from the bottom of the second fuel separation unit 152 and out from the separation system 108B using a second fuel fraction conduit 112. A computer control system 130 couples to portions of the separation system 108B to detect aspects of the operation and to send command signals to energized portions of the separation system 108B.

The fuel separation unit 150 and second fuel separation unit 152 may be of the same or different types of units and sizes. The separation units may be any units that are capable of achieving the desired fuel separation characteristics, flow rates and fuel fractions such as a flash drum, a distillation column, or other separators known in the art to separate a mixture into two or more fractions based on volatility.

In some embodiments, the fuel separation unit 150 and second fuel separation unit 152 may be a trayed distillation column. The number of trays, types of trays and the dimensions of the fuel separation unit 150 and second fuel separation unit 152 may be identical or different and may be based on the quantities and properties of the required fuel fractions.

In other embodiments, the fuel separation unit 150 and second fuel separation unit 152 may be a packed distillation column. Packing may be random or structured, and the types of packing may be any conventionally available packing. The examples of packing may be, but are not limited to, Heli-pak, Pro-Pak®, saddles, rings, balls, wires mesh, knitted packing, and the materials may be polymeric, metallic, ceramic or any other materials that are suitable for achieving desired fuel separation. The types of packing and the dimensions of the fuel separation unit 150 and second fuel separation unit 152 may be identical or different and may be chosen based on the quantities and properties of the required fuel fractions.

In some embodiments, one or both of the fuel separation unit 150 and the second fuel separation unit 152 may be a membrane distillation unit. Embodiment membrane distillation unit may include direct contact membrane distillation (MD), air gap MD, vacuum MD, sweeping gas MD, vacuum multi-effect MD, and permeate gap MD, among other MD unit that are suitable for achieving the desired fuel separation.

In some embodiments, the fuel separation unit 150 and the second fuel separation unit 152 may be a flash distillation column. In the embodiment flash distillation column, a fuel feed conduit 106B and the intermediate fuel fraction conduit 116 may have optional valves (not shown in FIG. 1B) which reduces the pressure of, and partially vaporize the fuel feed. The optional valves may be a throttling valve or any other valves conventionally used in a flash column.

In some embodiments, the heating coil 154 and the second heating coil 156 may be internal and placed inside, near the bottom of the fuel separation unit 150 and the second separation unit 152 and directly heat the fuel. In other embodiments, the heating coil 154 and the second heating coil 156 may be external and provide the heat by conduction through the wall of the fuel separation unit 150 and the second fuel separation unit 152. In some embodiments, the heating coil 154 and the second heating coil 156 are not coupled to each other and each may receive the hot fluid directly from the source, such as the combustion engine. In other embodiments, the heating coil return conduit 162 may be coupled to the second heating coil feed conduit 164, or the second heating coil return conduit 166 may be coupled to the heating coil feed conduit 160, such that the hot fluid may circulate through the heating coil 154 and the second heating coil 156 in series.

The embodiment demister 158 may be a mesh-type coalescer, vane pack or any other structures conventionally used in separation processes to remove mist from a vapor stream.

The above-described fuel separation systems may be used with various methods to operate a motor vehicle.

In one aspect, the present disclosure relates to a method of use of the on-board fuel separation system with a single fuel separation unit. The method may include introducing a vehicle fuel to the fuel separation unit 150 through the fuel feed conduit 106A. The vehicle fuel may be any type of fuel for combustion engines and may be of different auto-ignition characteristic values. In the present disclosure, "auto-ignition characteristic value" of a fuel refers to as a property of fuel that may influence the auto-ignition property of the fuel and may include research octane number (RON) and cetane number.

In some embodiments, the vehicle fuel may be gasoline such as 87 RON gasoline, 91 RON gasoline, 95 RON gasoline or gasoline with any other octane numbers. In other embodiments, the vehicle fuel may be diesel, naphtha, or any other types of fuel for combustion engines. In other embodiments, the vehicle fuel may contain additives, such as corrosion inhibitors, antiknock agents including tetraethyllead, alcohol, methylcyclopentadienyl manganese tricarbonyl (MMT), ferrocene, iron pentacarbonyl, toluene, isooctane, oxygenates including methanol, ethanol, isopropyl alcohol, n-butanol, tert-butanol, methyl tert-butyl ether (MTBE), tert-amyl methyl ether (TAME), tert-hexyl methyl ether (THEME), ethyl tert-butyl ether (ETBE), tert-amyl ethyl (TAEE), diIsopropyl ether (DIPE), antioxidants, detergents, lubricity enhancers, or other types of additives.

In some embodiments, the temperature of the vehicle fuel introduced to the fuel separation unit 150 may be an ambient temperature, or may have a lower limit of −50° C., −40° C., −30° C., −20° C., −10° C. or 0° C. to an upper limit of 100° C., 110° C., 120° C., 130° C., 140° C., or 150° C., where any lower limit may be used in combination with any upper limit. The vehicle fuel may be preheated prior to being introduced to the fuel separation unit 150, for example, with electric heating, heating tape, or any other methods.

In some embodiments, the pressure of the vehicle fuel introduced to the fuel separation unit 150 may have a lower limit of 0.5 bar, 1 bar, or 2 bar, to an upper limit of 2 bar, 5 bar or 10 bar, where any lower limit may be used in combination with any upper limit.

In some embodiments, the flow rate of the vehicle fuel introduced to the fuel separation unit 150 may have an upper limit of 50 L/h, 100 L/h, or 200 L/h.

In some embodiments, the method may further include operating the system such that the fuel separation unit separates and fractionates the introduced vehicle fuel into a first fuel fraction and a second fuel fraction. The first fuel fraction may have a first auto-ignition characteristic value and the second fuel fraction may have a second auto-ignition characteristic value.

In some embodiments, the vehicle fuel may be gasoline and the first fuel fraction may have high volatility and may be a vapor. The first auto-ignition characteristic value may be a low RON, such as ranging from a lower limit of 80, 81, 82 or 83 to an upper limit of 87, 88, 89 or 90, where any lower limit may be used in combination with any upper limit.

The first fuel fraction may have a specific gravity ranging from about 0.70 to 0.73 kg/L, a lower heating values (LHV) ranging from about 44 to 45 MJ/kg and an energy density ranging from about 31 to 32 MJ/L.

The first fuel fraction may also have a hydrogen to carbon (H/C) ratio ranging from about 1.9 to 2.1, an average molecular weight (MW) ranging from about 84 to 86 g/mol, a carbon intensity ranging from about 3.10 to 3.20 g $CO_2$/g fuel and a carbon intensity ranging from about 70 to 72 g $CO_2$/MJ fuel.

A percentage ratio of a volume of the first fuel fraction produced to the total volume of vehicle fuel introduced may range from a lower limit of 50%, 55% or 60% to the upper limit of 65%, 70% or 75%, where any lower limit may be used in combination with any upper limit. The first fuel fraction may contain a lower amount of components which increase the RON, such as aromatic and oxygenates, compared to the vehicle fuel.

In some embodiments, the vehicle fuel may be gasoline and the second fuel fraction may have low volatility and a liquid. The second auto-ignition characteristic value may be a high RON, such as ranging from a lower limit of 90, 91, 92, 93 or 94 to an upper limit of 105, 106, 107, 108 or 110, where any lower limit may be used in combination with any upper limit.

The second fuel fraction may have a specific gravity ranging from about 0.82 to 0.85 kg/L, a lower heating values (LHV) ranging from about 42 to 43 MJ/kg and an energy density ranging from about 35 to 36 MJ/L.

The second fuel fraction may also have a hydrogen to carbon (H/C) ratio ranging from about 1.4 to 1.6, an average molecular weight (MW) ranging from about 100 to 120 g/mol, a carbon intensity ranging from about 3.20 to 3.30 g $CO_2$/g fuel and a carbon intensity ranging from about 75 to 77 g $CO_2$/MJ fuel.

A percentage ratio of a volume of the second fuel fraction produced to the total volume of vehicle fuel introduced may range from a lower limit of 10%, 15% or 20% to the upper limit of 25%, 30% or 35%, where any lower limit may be used in combination with any upper limit. The second fuel fraction may contain a higher amount of components which increase the RON, such as aromatic and oxygenates, compared to the vehicle fuel.

In other embodiments, the vehicle fuel may be diesel and the first fuel fraction may have high volatility and the first auto-ignition characteristic value may be a high cetane number, such as ranging from a lower limit of 50, 51, or 52 to an upper limit of 55, 57 or 60, where any lower limit may be used in combination with any upper limit. The second fuel fraction may have low volatility and the second auto-ignition characteristic value may be a low cetane number, such as ranging from a lower limit of 40, 42 or 45 to an upper limit of 45, 47 or 50, where any lower limit may be used in combination with any upper limit.

In some embodiments, the fuel separation unit 150 may be operated at an overhead temperature ranging from a lower limit of 30° C., 40° C., or 50° C., to an upper limit of 100° C., 110° C., or 120° C., where any lower limit may be used in combination with any upper limit.

In some embodiments, the fuel separation unit 150 may be operated at a bottom temperature ranging from a lower limit of 70° C., 80° C., 90° C., 100° C. to an upper limit of 140°

C., 160° C., 180° C. or 200° C., where any lower limit may be used in combination with any upper limit.

In some embodiments, the fuel separation unit 150 may be operated at an ambient pressure, such as about 1 bar. In other embodiments, the fuel separation unit 150 may be operated under vacuum or a higher pressure than the ambient pressure, the pressure may range from a lower limit of 0 bar, 0.1 bar, 0.2 bar, 0.3 bar, 0.4 bar or 0.5 bar to an upper limit of 2 bar, 4 bar, 6 bar, 8 bar or 10 bar, where any lower limit may be used in combination with any upper limit.

In some embodiments, the separation of the fuel in the fuel separation unit 150 is driven by hot fluid, which may be vapor or liquid, as a heat source and the hot fluid is introduced to the heating coil 154 through the heating coil feed conduit 160. The examples of the hot fluid may be exhaust gas from the combustion engine or hot engine coolant from the combustion engine. In some embodiments, there may be a plurality of the heating coil 154 and a plurality of hot fluid, such that the plurality of hot fluid may be independently introduced to the heating coil 154 and utilized.

The exhaust gas from the combustion engine introduced to the heating coil 154 may have a temperature ranging from a lower limit of 50° C., 60° C. or 70° C. to an upper limit of 100° C., 200° C., 300° C., 400° C. or 500° C., where any lower limit may be used in combination with any upper limit, and may have a temperature drop raging from a lower limit of 5° C., 10° C. or 15° C. to an upper limit of 100° C., 200° C., 300° C., or 400° C. where any lower limit may be used in combination with any upper limit.

In other embodiments, the hot engine coolant introduced to the heating coil 154 may have a temperature ranging from a lower limit of 50° C., 60° C. or 70° C. to an upper limit of 100° C., 120° C., 140° C., 160° C., where any lower limit may be used in combination with any upper limit, and may have a temperature drop raging from a lower limit of 5° C., 10° C. or 15° C. to an upper limit of 30° C., 50° C., 75° C., or 100° C. where any lower limit may be used in combination with any upper limit.

The entire amount or a partial amount of the embodiment hot fluid exiting the combustion engine may be introduced to the fuel separation unit 150. The ratio of the amount of hot fluid introduced to the fuel separation unit 150 to the total amount of hot fluid exiting the combustion engine may range from a lower limit of 0%, 5%, 10% to an upper limit of 90%, 95% or 100%, where any lower limit may be used in combination with any upper limit.

In another aspect, the present disclosure relates to a method of use of a fuel separation system having two or more fuel separation units.

In some embodiments, the method may include introducing a vehicle fuel to the fuel separation unit 150 through the fuel feed conduit 106A. Types of the vehicle fuel, and the feed conditions of the vehicle fuel, such as temperature, pressure and flow rate, of the embodiments with a single fuel separation unit, as described in the previous paragraphs, may be applied to the separation system with two or more fuel separation units.

In some embodiments, the method may further include operating the system such that the fuel separation units separate and fractionate the introduced vehicle fuel into a first fuel fraction, a second fuel fraction and a third fuel fraction. The first fuel fraction may be represented by a first auto-ignition characteristic value, the second fuel fraction may be represented by a second auto-ignition characteristic value and the third fuel fraction may have a third auto-ignition characteristic value.

In some embodiments, the vehicle fuel introduced to the fuel separation unit 150 may be separated into the third fuel fraction as a vapor and an intermediate fuel fraction as a liquid.

In some embodiments, the vehicle fuel may be gasoline and the third fuel fraction may have high volatility and may be a vapor. The third auto-ignition characteristic value may be a high RON, such as ranging from a lower limit of 90, 91, 92, 93 or 94 to an upper limit of 105, 106, 107, 108 or 110, where any lower limit may be used in combination with any upper limit.

A percentage ratio of a volume of the third fuel fraction produced to the total volume of vehicle fuel introduced may range from a lower limit of 10%, 15% or 20% to the upper limit of 25%, 30% or 35%, where any lower limit may be used in combination with any upper limit. The third fuel fraction may contain a higher amount of components which increases the RON, such as aromatic and oxygenates, compared to the vehicle fuel.

The embodiment intermediate fuel fraction may have low volatility and may be a liquid. The intermediate fuel fraction may have a RON ranging from a lower limit of 85, 86 or 87 to an upper limit of 90, 91 or 92, where any lower limit may be used in combination with any upper limit. A percentage ratio of a volume of the intermediate fuel fraction produced to the total volume of vehicle fuel introduced may range from a lower limit of 65%, 70% or 75% to the upper limit of 80%, 85% or 90% where any lower limit may be used in combination with any upper limit.

In some embodiments, the fuel separation unit 150 may be operated at a temperature ranging from a lower limit of 30° C., 40° C., 50° C., to an upper limit of 100° C., 110° C., or 120° C. where any lower limit may be used in combination with any upper limit.

In some embodiments, the fuel separation unit 150 may be operated at a bottom temperature ranging from a lower limit of 70° C., 80° C., 90° C., 100° C. to an upper limit of 140° C., 160° C., 180° C. or 200° C., where any lower limit may be used in combination with any upper limit.

In some embodiments, the fuel separation unit 150 may be operated at an ambient pressure, such as about 1 bar. In other embodiments, the fuel separation unit 150 may be operated under vacuum or a higher pressure than the ambient pressure, the pressure may range from a lower limit of 0 bar, 0.1 bar, 0.2 bar, 0.3 bar, 0.4 bar or 0.5 bar to an upper limit of 2 bar, 4 bar, 6 bar, 8 bar or 10 bar, where any lower limit may be used in combination with any upper limit.

In some embodiments, the separation of the fuel in the fuel separation unit 150 is driven by a hot fluid introduced to the heating coil 154 through the heating coil feed conduit 160. The types of hot fluid that may be used in the heating coil, and the operating conditions are described in the previous paragraphs.

In some embodiments, the method may further include introducing the intermediate fuel fraction to the second fuel separation unit 152 through the intermediate fuel fraction conduit (liquid) 116. The intermediate fuel fraction introduced to the second fuel separation unit 152 may be separated into the first fuel fraction as a vapor and the second fuel fraction as a liquid. In other embodiments, the intermediate fuel fraction may optionally be mixed with the vehicle fuel in order to maximize the difference in RON of fuel fractions or to provide, according to the engine operating conditions, a desirable vapor to liquid ratio at a certain RON difference between fuel fractions.

The embodiment first fuel fraction may have low volatility and may be a vapor. The first fuel fraction may have properties as described in the previous paragraphs.

A percentage ratio of a volume of the first fuel fraction produced to the total volume of vehicle fuel introduced may range from a lower limit of 15%, 20% or 25% to the upper limit of 30%, 35% or 40%, where any lower limit may be used in combination with any upper limit.

The embodiment second fuel fraction may have low volatility and may be a liquid. The second fuel fraction may have properties as described in the previous paragraphs.

A percentage ratio of a volume of the second fuel fraction produced to the total volume of vehicle fuel introduced may range from a lower limit of 40%, 45% or 50% to the upper limit of 55%, 60% or 65%, where any lower limit may be used in combination with any upper limit.

In other embodiments, the vehicle fuel may be diesel and the first fuel fraction may have intermediate volatility and the first auto-ignition characteristic value may be a high cetane number, such as ranging from a lower limit of 42, 43 or 44 to and upper limit of 53, 54, or 55 where any lower limit may be used in combination with any upper limit. The second fuel fraction may have low volatility and the second auto-ignition characteristic value may be a low cetane number, such as ranging from a lower limit of 40, 42 or 45 to and upper limit of 45, 47 or 50, where any lower limit may be used in combination with any upper limit. The third fuel fraction may have high volatility and the third auto-ignition characteristic value may be a high cetane number, such as ranging from a lower limit of 50,51 or 52 to and upper limit of 55,57 or 60, where any lower limit may be used in combination with any upper limit.

In some embodiments, the second fuel separation unit 152 may be operated under the same conditions as the fuel separation unit 150. In other embodiments, the operating conditions of the second fuel separation unit 152 may be different from the operating conditions of the fuel separation unit 150 depending on the fuel fractions that need to be produced. In some embodiments, the fuel separation unit 150 may be operated as described in the previous paragraphs. The second fuel separation unit 152 may be operated at a temperature ranging from a lower limit of 50° C., 60° C., 70° C., to an upper limit of 100° C., 120° C., or 140° C. where any lower limit may be used in combination with any upper limit.

In some embodiments, the second fuel separation unit 152 may be operated at an ambient pressure, such as about 1 bar. In other embodiments, the second fuel separation unit 152 may be operated under vacuum or a higher pressure than the ambient pressure, the pressure may range from a lower limit of 0 bar, 0.1 bar, 0.2 bar, 0.3 bar, 0.4 bar or 0.5 bar to an upper limit of 2 bar, 4 bar, 6 bar, 8 bar or 10 bar, where any lower limit may be used in combination with any upper limit.

In some embodiments, the separation of the fuel in the second fuel separation unit 152 is driven by a hot fluid introduced to the second heating coil 156 through the second heating coil feed conduit 164.

Embodiment hot fluid introduced to the fuel separation unit 150 and the second fuel separation 152 may have the same or different operating conditions, such as the hot fluid temperature introduced to the heating coils, temperature drop of the hot fluid and the amount of hot fluid introduced to each heating coils with respect to the total amount of hot fluid exiting the combustion engine. The types of hot fluid that may be used, and the operating conditions are described in the previous paragraphs.

In other aspects, the present disclosure relates to a vehicle system including a fuel separation subsystem as described hereinabove.

Figure 2:
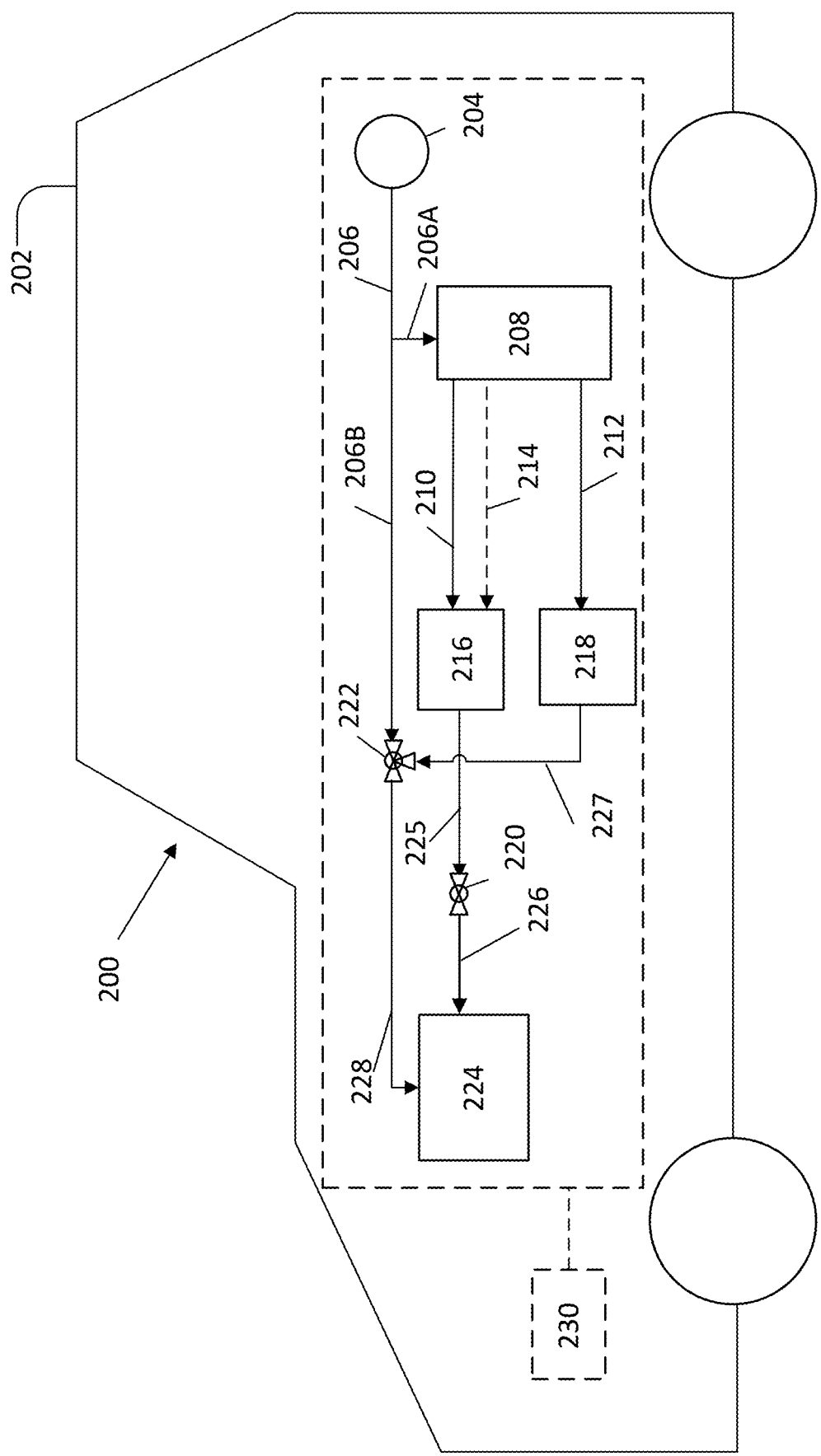
FIG. 2 is a schematic diagram of an exemplary vehicle system with an on-board fuel separation system.

FIG. 2 is a schematic for an exemplary vehicle system 200 according to embodiments herein. A vehicle 202 is shown as an automobile. However, the vehicle 202 may be an automobile, a motorized cycle, an all-terrain vehicle (ATV), a nautical vehicle such as a boat or another type of nautical vehicle, or an airborne vehicle such as a plane, an ultralight, or a drone or another type of airborne vehicle, whether manned or unmanned. More generally, the term "vehicle" as used here refers to any apparatus that derives powered movement from a hydrocarbon liquid fuel, such as gasoline, naphtha, diesel, jet fuel, or another such fuel. A vehicle can be any apparatus that includes an engine designed to use a fuel having an auto-ignition characteristic value, such as RON.

Vehicle fuel stored in a fuel tank 204 is introduced into the separation system 208 using a fuel feed conduit 206 and a fuel feed conduit to a fuel separation system 206A, which may be a branched conduit of the fuel feed conduit 206. The fuel feed conduit 206 may have another branch, a fuel feed conduit to a combustion engine 206B, through which a portion of the vehicle fuel may be introduced to a combustion engine 224. The fuel separation system 208 fractionates the vehicle fuel into a first fuel fraction, a second fuel fraction and optionally a third fuel fraction.

The first fuel fraction exits the fuel separation system 208 using a first fuel fraction conduit (vapor) 210 and is introduced to a vapor fraction storage tank 216, which is coupled to the first fuel fraction conduit (vapor) 210. The second fuel fraction exits the fuel separation system 208 using a second fuel fraction conduit (liquid) 212 and is introduced to a liquid fraction storage tank 218 coupled to the second fuel fraction conduit (liquid) 212. Optional third fuel fraction exits the fuel separation system 208 using an optional third fuel fraction conduit (vapor) 214 and is introduced to the vapor fraction storage tank 216. In some embodiments, the first fuel fraction conduit (vapor) 210 and the optional third fuel fraction conduit (vapor) 214 may be joined before coupled to the vapor fraction storage tank 216 such that the first fuel fraction and the third fuel fraction may mix and a vapor fuel feed is produced before being introduced to the vapor fraction storage tank 216. In other embodiments, the first fuel fraction conduit (vapor) 210 and the optional third fuel fraction conduit (vapor) 214 may be coupled to the vapor fraction storage tank 216 independently. The first fuel fraction and the optional third fuel fraction may mix in the vapor fraction storage tank 216 such that a vapor fuel feed is produced. In other embodiments, the vapor fraction storage tank 216 may have an internal partition which may keep the first fuel fraction and the optional third fuel fraction separated in the vapor fraction storage tank 216. In yet other embodiments, there may be a plurality of the vapor fraction storage tank 216 and the first fuel fraction and the optional third fuel fraction may be stored separately.

In some embodiments where the first fuel fraction and the optional third fuel fraction are mixed prior to being introduced to the vapor fraction storage tank 216, or are mixed while being stored in the vapor fraction storage tank 216, the vapor fuel feed may exit the vapor fraction storage tank 216 using a vapor fuel fraction feed conduit (vapor) 225 which may be coupled to a vapor fuel feed manifold/control valve 220. In other embodiments, where the first fuel fraction and the optional third fuel fraction are stored separately, there may be a plurality of the vapor fuel fraction feed conduit (vapor) 225 coupled to the vapor fraction storage tank 216 and the first fuel fraction and the optional third fuel fraction exits the vapor fraction storage tank 216 separately. In some embodiments, the plurality of the vapor fuel fraction feed conduit (vapor) 225 may be joined before coupled to the vapor fuel feed manifold/control valve 220, such that the first fuel fraction and the optional third fuel fraction may mix and the vapor fuel feed may be produced prior to being introduced to the vapor fuel feed manifold/control valve 220. In other embodiments, the plurality of the vapor fuel fraction feed conduit (vapor) 225 may be coupled to the vapor fuel feed manifold/control valve 220 independently, such that the first fuel fraction and the optional third fuel fraction may be introduced to the vapor fuel feed manifold/control valve 220 separately.

In some embodiments, the vapor fuel feed manifold/control valve 220 is coupled to a vapor fuel engine feed 226, which is coupled to the combustion engine 224. In some embodiments, the first vapor fraction and the optional third fraction may be mixed as they flow through the vapor fuel feed manifold/control valve 220 and are then introduced to the combustion engine 224 as the vapor fuel feed, using the vapor fuel engine feed conduit 226. In other embodiments, the vapor fuel feed flows through the vapor fuel feed manifold/control valve 220 and is introduced to the combustion engine 224 using the vapor fuel engine feed conduit 226.

In some embodiments, second fuel fraction may exit the liquid fraction fuel tank 218 using a liquid fuel fraction feed conduit 227, which is coupled to a liquid fuel feed manifold/control valve 222. The liquid fuel feed manifold/control valve 222 is coupled to a liquid fuel engine feed conduit 228, which is coupled to the combustion engine 224. The liquid fuel feed manifold/control valve 222 may also be coupled to the fuel feed conduit to combustion engine 224 such that the liquid fuel fraction may be mixed with the vehicle fuel flown from the fuel tank 204 and a liquid fuel feed is produced before introduced to the combustion engine 224 using the liquid fuel engine feed conduit 228.

A computer control system 230 couples to portions of the vehicle system 200 to detect aspects of the operation and to send command signals to energized portions of the vehicle system 200.

In some embodiments, the fuel tank 204 may be a conventional liquid fuel tank of any size used to store a vehicle fuel.

In some embodiments, the fuel separation system 208 may have a single separation unit or multiple separation units, as described in the previous paragraphs.

In some embodiments, the liquid fraction storage tank 218 may be a conventional liquid fuel tank of any size.

In some embodiments, the vapor fraction storage tank 216 may contain solid sorbents such that the first fuel fraction and optional third fuel fraction may be temporarily stored without being condensed. The vapor fraction storage tank 216 may contain different solid sorbents such that the first fuel fraction and the optional third fuel fraction may be stored separately. In other embodiments, the vapor fraction storage tank 216 may contain one type of solid sorbents to store multiple fuel fractions in a vapor form. In other embodiments, the vapor fraction storage tank 216 may have other absorption and desorption means to store the first fuel fraction and optional third fuel fraction without being condensed.

In some embodiments, the combustion engine 224 is configured to accept the vapor fuel feed and a liquid fuel feed such that an appropriate ratio of the vapor fuel feed to the liquid fuel feed may be introduced to the combustion engine 224 based operating condition of the vehicle.

Embodiments of the present disclosure also relate to a method of use of a vehicle system with an on-board fuel separation system.

In some embodiments, the method may include operating the vehicle system such that the vehicle fuel is introduced into the fuel separation system. Types of vehicle fuel that may be used, and the feed conditions of the vehicle fuel, such as temperature, pressure and flow rate, are described in the previous paragraphs under the method of use of the on-board fuel separation system.

In some embodiments, the method may further include operating the vehicle system such that the introduced vehicle fuel is separated and a plurality of fuel fractions are formed. In some embodiments the plurality of fuel fractions may include a first fuel fraction, second fuel fraction and optional third fuel fraction, which may have a first auto-ignition characteristic value, a second auto-ignition characteristic value and a third auto-ignition characteristic value. Attributes of the plurality of the fuel fractions, such as RON, cetane number, a percentage ratio of a volume of the fuel fraction produced to the total volume of vehicle fuel introduced, are described in the previous paragraphs under the method of use of on-board fuel separation system.

In some embodiments, the method may further include operating the vehicle system such that the first fuel fraction and the optional third fuel fraction from the fuel separation system are recovered as vapor, and are maintained as vapor throughout the vehicle system. In other words, the first fuel fraction and the optional third fuel fraction are not condensed regardless of where they are located within the vehicle system until they are consumed by the combustion engine as fuel. By maintaining the aforementioned fuel fractions as vapor, the requirement for additional liquid fuel tank is eliminated, resulting in a simpler vehicle system which may be more compact and less complicated for control purposes.

In some embodiments, the method may include operating the vehicle system such that the first fuel fraction is introduced into the vapor fraction storage tank 216. The first fuel fraction introduced into the vapor fraction storage tank 216 may have temperature with a lower limit of 30° C., 40° C., or 50° C., to an upper limit of 100° C., 110° C., or 120° C., where any lower limit may be used in combination with any upper limit.

In some embodiments, the method may include operating the vehicle system such that the optional third fuel fraction is introduced into the vapor fraction storage tank 216. The third fuel fraction introduced into the vapor fraction storage tank 216 may have a temperature with a lower limit of 30° C., 40° C., 50° C., to an upper limit of 100° C., 110° C., or 120° C., where any lower limit may be used in combination with any upper limit.

In some embodiments, the operating temperature of the vapor fraction storage tank 216 may range from a lower limit about 30° C. to an upper limit of 120° C. and the operating pressure may range from a lower limit of about 0 bar to an upper limit of 2 bar, in order to allow the absorption of the first fuel fraction and the optional third fuel fraction, or the combined vapor fuel fraction. In some embodiments, where the first fuel fraction and the optional third fuel fraction may be stored separately in the vapor fraction storage tank 216 that is partitioned or in a plurality of the vapor fraction storage tank 216, the vapor fraction storage tank 216 may have multiple operating temperatures and pressures in order to optimize the conditions for the absorption for each vapor fraction. The temperature and pressure of the vapor fuel fraction are controlled such that condensation of vapor fuel fraction may be avoided. In some embodiments, the vapor fraction storage tank 216 may have an optional heating coil or tape to control the temperature of the tank to improve the rate of adsorption and desorption of the vapor fuel fraction. In some embodiments, vapor fuel feed manifold/control valve 220 may be utilized to control the pressure of the vapor fuel feed introduced to the combustion engine 224.

In other embodiments, the operating temperature of the vapor fraction storage tank 216 may range from a lower limit of about 50° C. to an upper limit of 150° C. and the operating pressure may range from a lower limit of about 0 bar to an upper limit of 2 bar, in order to allow the desorption of the first fuel fraction and the optional third fuel fraction, or the combined vapor fuel fraction. In some embodiments, where the first fuel fraction and the optional third fuel fraction may be stored separately in the vapor fraction storage tank 216 that is partitioned or in a plurality of the vapor fraction storage tank 216, the vapor fraction storage tank 216 may have multiple operating temperatures and pressures in order to optimize the conditions for the desorption for each vapor fraction.

In some embodiments, the method may include operating the vehicle system such that the second fuel fraction is introduced into the liquid fraction storage tank 218. The second fuel fraction introduced into the liquid fraction storage tank 218 may have a temperature with a lower limit of 0° C., 10° C., 20° C., 30° C. to an upper limit of 60° C., 70° C., 80° C. or 90° C., where any lower limit may be used in combination with any upper limit.

In some embodiments, the operating temperature of the liquid fraction storage tank 218 may be at an ambient temperature, or may have a lower limit of −50° C., −40° C., −30° C., −20° C., −10° C. or 0° C. to an upper limit of 60° C., 70° C., 80° C., or 90° C., where any lower limit may be used in combination with any upper limit.

In some embodiments, the method may further include operating the vehicle system such that the first fuel fraction and the optional third fuel fraction are mixed and a vapor fuel feed is produced. In some embodiments, the mixing of the first fuel fraction and the optional third fuel fraction may occur before being introduced to the vapor fraction storage tank 216, in the vapor fraction storage tank 216, as exiting the vapor fraction storage tank 216, or while flowing through the vapor fuel feed manifold/control valve 220. The vapor fuel feed may have a ratio of the first fuel fraction to the optional third fuel fraction ranging from a lower limit of 0%, 10%, 20% or 30% to an upper limit of 70%, 80%, 90%, or 100% where any lower limit may be used in combination with any upper limit.

In some embodiments, the method may further include operating the vehicle system such that the second fuel fraction and the vehicle fuel are mixed and a liquid fuel feed is produced. In some embodiments, the mixing of the second fuel fraction and the vehicle fuel may while flowing through the liquid fuel feed manifold/control valve 222. The liquid fuel feed may have a ratio of the second fuel fraction to the vehicle fuel ranging from a lower limit of 0%, 10%, 20% or 30% to an upper limit of 70%, 80%, 90%, or 100% where any lower limit may be used in combination with any upper limit.

In some embodiments, the method may further include operating the vehicle system such that a vapor fuel feed is introduced into the combustion engine 224. In some embodiments, the vapor fuel feed may include the first fuel fraction. In other embodiments, the vapor fuel feed may include the optional third fuel fraction. In yet other embodiments, the vapor fuel feed may include the first fuel fraction and the optional third fuel fraction at any ratios as described previously.

In some embodiments, the vapor fuel feed may have a temperature ranging from a lower limit of 70° C., 80° C., 90° C., 100° C. to an upper limit of 140° C., 160° C., 180° C. or 200° C., where any lower limit may be used in combination with any upper limit.

In some embodiments, the method may further include operating the vehicle system such that a liquid fuel feed is introduced into the combustion engine 224. In some embodiments, the liquid fuel feed may include the second fuel fraction. In other embodiments, the liquid fuel feed may include the vehicle fuel. In yet other embodiments, the liquid fuel feed may include the second fuel fraction and the vehicle fuel at any ratios as described previously.

In some embodiments, the liquid fuel feed may be introduced to the combustion engine 224 at an ambient temperature. In other embodiments, the liquid fuel feed may have a temperature ranging from a lower limit of −50° C., −40° C., −30° C., −20° C., −10° C. or 0° C. to an upper limit of 100° C., 110° C., 120° C., 130° C., 140° C., or 150° C., where any lower limit may be used in combination with any upper limit.

In some embodiments, the method may further include operating the vehicle system such that the vapor fuel feed and the liquid fuel feed are introduced into the combustion engine. In some embodiments, a ratio of the vapor fuel feed to the liquid fuel feed may range from a lower limit of 0%, 10%, 20% or 30% to an upper limit of 70%, 80%, 90%, or 100% where any lower limit may be used in combination with any upper limit. The vapor fuel feed may have a ratio of the first fuel fraction to the optional third fuel fraction as described previously, and the liquid fuel feed may have a range of a ratio of the second fuel fraction to the vehicle fuel as described previously.

The vehicle systems and fuel separation systems described above may also include a system or systems to control the separations and associated feed systems of the separation systems during vehicle operation. In one aspect, the present disclosure relates to a computer control system configured to control the on-board fuel separation system based on an operating characteristic of the combustion engine. The operating characteristic of the combustion engine may include, but not limited to, engine load, engine torque and engine speed.

In some embodiments, the computer control system may be a microprocessor-based system or a microprocessor-based system combined with other control systems such as mechanical, pneumatic and electromechanical systems.

In some embodiments, the computer control system may further include detectors configured to detect and measure the operating characteristic of the combustion engine.

In some embodiments, the computer control system may further include detectors configured to detect and measure fuel characteristics of plurality of fuels including the vehicle fuel, first fuel fraction, second fuel fraction and optional third fuel fraction. The fuel characteristics may include, but not limited to, RON, cetane number, vapor-liquid ratio, vapor lock index, drivability index, viscosity, lubricity, distillation recovery values such as T90 and T95, specific gravity, LHV, energy density, H/C ratio, molecular weight, carbon intensity, temperature and pressure.

In some embodiments, the computer control system may further include detectors configured to detect and measure operating characteristic of the fuel separation system. The operating characteristic of the fuel separation system may include, but not limited to, the operating temperatures and pressures of the fuel separation unit, flow rates of the vehicle fuel, first fuel fraction, second fuel fraction, optional third fuel fraction, operating temperature of the heating coils and flow rates of the hot fluid for the heating coils.

In one aspect, the present disclosure relates to a method of use of the computer control system configured to control the fuel separation. In some embodiments, the method may include operating the computer control system such that the operating characteristic of the fuel separation system are adjusted based on the operating characteristic of the combustion engine and the fuel characteristics of the plurality of fuels including the vehicle fuel, first fuel fraction, second fuel fraction and optional third fuel fraction.

In yet another aspect, the present disclosure relates to a computer control system configured to control the vehicle system based on operating characteristics of the combustion engine. In some embodiments, the computer control system may be a microprocessor-based system or a microprocessor-based system combined with other control systems such as mechanical, pneumatic and electromechanical systems.

In some embodiments, the computer control system may further include detectors configured to detect and measure the operating characteristics of the combustion engine.

In some embodiments, the computer control system may further include detectors configured to detect and measure fuel characteristics of a plurality of fuels including the vehicle fuel, first fuel fraction, second fuel fraction and optional third fuel fraction. The fuel characteristics may include, but not limited to, RON, cetane number, viscosity, temperature and pressure.

In some embodiments, the computer control system may further include detectors configured to detect and measure operating characteristics of a fuel supply system which include operating characteristics of the fuel separation system, vapor fraction storage tank and liquid fraction storage tank. The operating characteristic of the fuel separation system may include, but not limited to, the operating temperatures and pressures of the fuel separation unit is as described in the previous paragraphs. The operating characteristic of the vapor fraction storage tank and the liquid fraction storage tank may include, but not limited to, temperature, pressure and fuel level.

In some embodiments, the computer control system may further include fuel feed controllers configured to adjust vapor fuel feed manifold/control valve and liquid fuel feed manifold/control.

In some embodiments, the computer control system may further include a data storage such that collected data and instructions for the computer control system.

In further embodiments, the computer control system may estimate a ratio and/or a rate of the vapor and liquid fuel feeds to be sent to the engine for consumption. The computer control system may adjust an operating condition, such as a feed rate of hot fluid (heat supplied to partially vaporize the fuel) to supply the vaporized fuel fraction at the required ratios/rates. To provide an uninterrupted supply of the vapor stream at the beginning of transient to high engine speed or load (with high fuel demand), the vapor stream may first go to a small tank/canister upstream of the engine. In one option this tank/canister has material capable of temporarily storing the vapor, such as solid sorbents. The temperatures and pressures of the flash tank (or the temperature profile of the compact distillation unit, number of equilibrium stages, feed location and reflux ratio) are controlled or selected to optimize the octane/cetane number and the flow rates of the high and low octane/cetane fuel streams.

Separation operating conditions may be selected to maintain smooth running of the engine and its reliability and longevity: For gasoline, operating conditions may include one or more of the following properties: Vapor-Liquid ratio, Vapor Lock index, Drivability index. For Diesel, operating conditions may include one or more of the following properties: T90 or T95, lubricity and viscosity.

In some embodiments, for example, a specified temperature cut point may be provided with controls that learn the optimal operation of the system; where a mass rate of the vapor generated is determined by the engine air-fuel ratio and the make-up fuel needed to reach a desired air-fuel ratio and the engine knock performance and resulting RON performance of the fuel identified when operating the engine at higher loads and using knock detection.

Fuels that have lower octane in the vapor phase, high octane liquid generation would occur during lighter-load operation while directly feeding the vapor into the intake manifold or through a pressurized system for direct injecting vapor into the intake manifold or into the engine. The total vapor generation may be determined by the feedback oxygen detection system and the feed forward make-up fuel mass and the feed forward vapor mass.

Fuels that have a higher octane in the vapor phase, high octane vapor generation would occur during higher engine load operation, where the lower octane liquid would be stored until consuming when operating the engine at lower load conditions.

In various embodiments, a nominal fuel cut point temperature may be provided for each vehicle, and may depend on intended market location (cold, moderate, or warm environments, as well as expected types of fuel and seasonal fuel blends that may be used in each). The fuel separation and consumption approaches may be identified, learned, and adapted to by the control system as the vehicle is driving.

In another aspect, the present disclosure relates to a method of use of the computer control system configured to control the vehicle. In some embodiments, the method may include operating the computer control system such that the operating characteristic of the fuel supply system including operating characteristics of the fuel separation system, vapor fraction storage tank and liquid fraction storage tank are adjusted based on the operating characteristic of the combustion engine and the fuel characteristics of the plurality of fuels including the vehicle fuel, first fuel fraction, second fuel fraction and optional third fuel fraction.

In some embodiments, the method may further include operating the computer control system such that the fuel feed controllers adjusts the vapor fuel feed manifold/control valve and the liquid fuel feed manifold/control. In some embodiments, the vapor fuel feed manifold/control valve and the liquid fuel feed manifold/control are adjusted such that parameters such as flow rates of the plurality of fuels including the vehicle fuel, first fuel fraction, second fuel fraction, optional third fuel fraction, vapor fuel feed and liquid fuel feed, and the ratio of first fuel fraction to optional third fuel fraction in the vapor fuel, ratio of second fuel, are controlled based on the operating characteristic of the combustion engine and the fuel characteristics of the plurality of fuels including vehicle fuel, first fuel fraction, second fuel fraction and optional third fuel fraction.

EXAMPLES

Separation and fractionation of a vehicle fuel was conducted by the following method. A commercially available vehicle fuel, Saudi 91 gasoline, was distilled in a single stage flash tank. The pressure of the tank was set at 1 bar absolute (bara) and the temperature was varied between the bubble point of approximately 50° C. and the dew point of approximately 120° C. The vehicle fuel was separated into 70 volume % vapor fraction and 30 volume % liquid fraction at approximately 82° C. The properties of the vapor fraction and the liquid fraction are summarized in Table 1. The vapor fraction was condensed prior to determining the properties.

TABLE 1

|  | Input vehicle fuel Saudi 91 Gasoline | Vapor fraction (overhead) 70 volume % | Liquid fraction (bottom) 30 volume % |
| --- | --- | --- | --- |
| RON | 90.9 | 88.1 | 100.7 |
| Specific Gravity (kg/L) | 0.7329 | 0.7100 | 0.8359 |
| LHV (MJ/kg) | 43.9 | 44.3 | 42.9 |
| Energy Density (MJ/L) | 32.1 | 31.5 | 35.9 |
| H/C Ratio | 1.89 | 2.02 | 1.48 |
| Average MW (g/mol) | 89.9 | 85.5 | 110.6 |
| Carbon Intensity (g CO2/g fuel) | 3.17 | 3.14 | 3.26 |
| Carbon Intensity (g CO2/MJ fuel) | 72.3 | 70.9 | 76.0 |

The results provided in Table 1 show that the input vehicle fuel with a RON of 90.9 was fractionated into a vapor fraction with a RON of 88.1 and a liquid fraction with a RON of 100.7.

Figure 3:
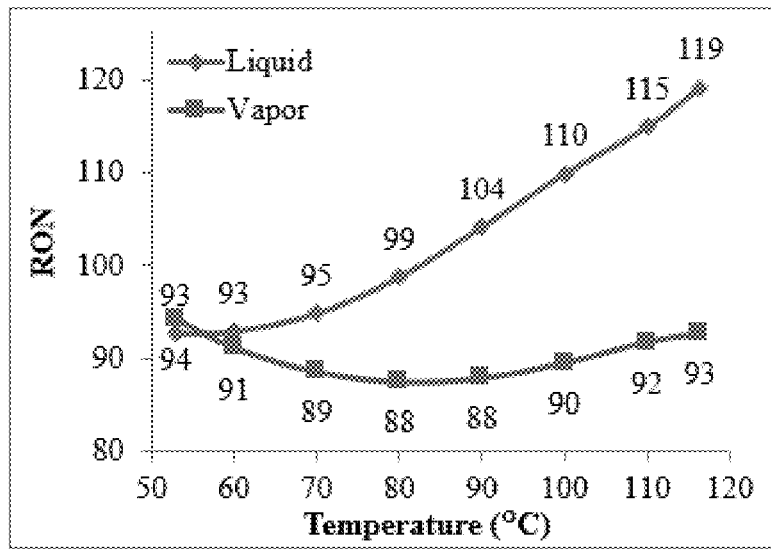
FIG. 3 is a graph of estimated research octane number (RON) versus flash tank temperature of 91 RON gasoline obtained from HYSYS® simulation with a single flash distillation tank configuration.

A process simulation was conducted utilizing HYSYS® chemical process simulator available from Aspen Technology Inc. A single flash distillation tank configuration was utilized for the simulation. The results are shown in FIG. 3. FIG. 3 illustrates that RON provided by the simulation generally agree with the RON obtained by the experiment.

Figure 4:
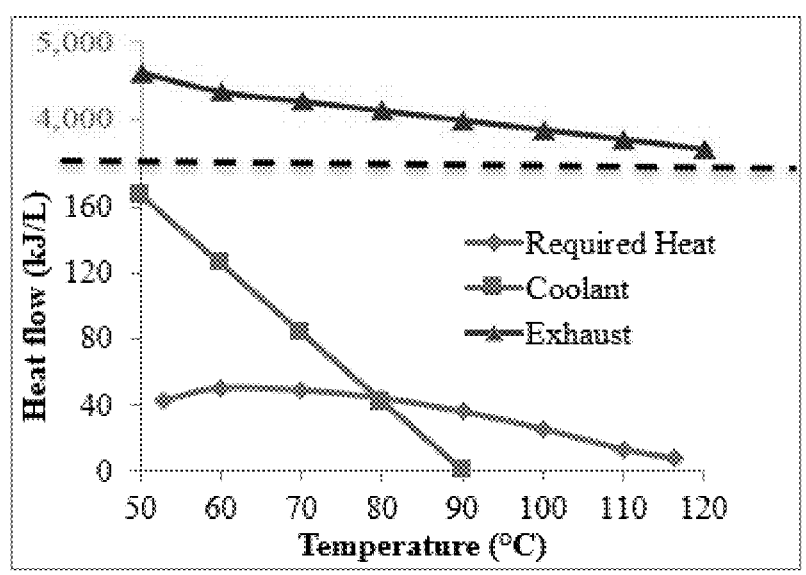
FIG. 4 is a graph of heat flow rate versus flash tank temperature of 91 RON gasoline obtained from HYSYS® simulation with a single flash distillation tank configuration.

FIG. 4 illustrates the required heat flow obtained from the previously-described process simulation and estimated heat flows that may be provided by the exhaust and hot engine coolant from a combustion engine of a vehicle. FIG. 4 demonstrates that available heat flows of the exhaust and hot engine coolant exceed the required heat to drive the fuel separation and fractionation, and thus, either or both may be used as hot fluids for the fuel separation units of the present disclosure. In particular, the hot engine coolant may be utilized for lower temperature fuel separation, such as up to approximately 90° C., while the exhaust may be used for higher temperature fuel separation, such as up to approximately 300° C.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

"Optionally" or "optional" means that the subsequently described event or circumstances may or may not occur. The description includes instances where the event or circumstance occurs and instances where it does not occur.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A vehicle system comprising:
a fuel separation system;
a combustion engine; and
a computer control system,
wherein:
the fuel separation system comprises one or more fuel separation units configured to receive and separate a vehicle fuel into a plurality of fuel fractions comprising a first fuel fraction, a second fuel fraction and an optional third fuel fraction,
the vehicle system is configured to recover from the fuel separation system and maintain the first fuel fraction and the optional third fuel fraction as vapor throughout the vehicle system,
the combustion engine is configured to receive a vapor fuel feed and a liquid fuel feed, the vapor fuel feed comprising at least one of the first fuel fraction and the optional third fuel fraction and the liquid fuel feed comprising at least one of the second fuel fraction and the vehicle fuel.

2. The vehicle system of claim 1, wherein the one or more fuel separation units are selected from at least one of a flash drum, a membrane distillation unit and a distillation column.

3. The vehicle system of claim 1, wherein the one or more fuel separation units further comprise a valve configured to control a pressure of the one or more fuel separation units.

4. The vehicle system of claim 1, wherein the computer control system is configured to adjust fuel feed controllers and operating characteristics of the fuel separation system, based on operating characteristics of the combustion engine, operating characteristics of a fuel supply system and fuel characteristics of a plurality of fuels.

5. The vehicle system of claim 1, further comprising a vapor fraction storage tank that is configured to store and maintain the first fuel fraction and the optional third fuel fraction as vapor.

6. The vehicle system of claim 5, further comprising a heating coil or a heating tape disposed around at least a portion of the vapor fraction storage tank.

7. The vehicle system of claim 6, wherein the vehicle system is configured to control a temperature of the vapor fraction storage tank.

8. The vehicle system of claim 1, further comprising a liquid fraction storage tank.

9. The vehicle system of claim 1, wherein the one or more fuel separation units are configured to receive hot fluids comprising at least one of exhaust gas of the combustion engine and hot engine coolant of the combustion engine.

10. A method for operating a vehicle system, comprising:
separating a vehicle fuel with a fuel separation system into a plurality of fuel fractions comprising a first fuel fraction, a second fuel fraction and an optional third fuel fraction;
recovering the first fuel fraction and the optional third fuel fraction from the fuel separation system as vapor;
maintaining the first fuel fraction and the optional third fuel fraction as vapor throughout the vehicle system;
producing a vapor fuel feed comprising at least one of the first fuel fraction and the optional third fuel fraction, and a liquid fuel feed comprising at least one of the second fuel fraction and the vehicle fuel; and
introducing at least one of the vapor fuel feed and the liquid fuel feed to a combustion engine.

11. The method of claim 10, further comprising controlling a temperature and a pressure of the fuel separation system.

12. The method of claim 10, wherein the fuel separation system comprises one or more fuel separation units.

13. The method of claim 10, further comprising adjusting, with a computer control system, fuel feed controllers and operating characteristics of the fuel separation system, based on operating characteristics of the combustion engine, operating characteristics of a fuel supply system and fuel characteristics of a plurality of fuels.

14. The method of claim 10, further comprising storing the first fuel fraction and the optional third fuel fraction as vapor in a vapor fraction storage tank.

15. The method of claim 10, wherein the separating is performed by hot fluids comprising at least one of exhaust gas of the combustion engine and hot engine coolant of the combustion engine.

16. The method of claim 10, wherein the first fuel fraction has a RON ranging from 80 to 90, the second fuel fraction has a RON ranging from 90 to 110, and the optional third fuel fraction has a RON ranging from 90 to 110.

17. The method of claim 10, wherein the first fuel fraction has a cetane number ranging from 50 to 60, the second fuel fraction has a cetane number ranging from 40 to 50, and the third fuel fraction has a cetane number ranging from 45 to 55.

* * * * *